(12) United States Patent
Weder

(10) Patent No.: US 6,354,039 B1
(45) Date of Patent: Mar. 12, 2002

(54) FLOWER BLOOM PROTECTIVE DEVICE

(75) Inventor: Donald E. Weder, Highland, IL (US)

(73) Assignee: Southpac Trust Int'l, Inc.

( * ) Notice: Subject to any disclaimer, the term of this patent is extended or adjusted under 35 U.S.C. 154(b) by 0 days.

(21) Appl. No.: 09/416,718

(22) Filed: Oct. 13, 1999

(51) Int. Cl.$^7$ ................................................ A01G 5/00
(52) U.S. Cl. ..................................... 47/41.15; 428/35.2
(58) Field of Search ............................ 47/41.01, 41.15, 47/72, 55, 29, 30, 28.1, 26; 206/423, 526; 428/23, 34.3, 35.2

(56) References Cited

U.S. PATENT DOCUMENTS

| | | | | |
|---|---|---|---|---|
| 1,541,923 A | * | 6/1925 | Cunningham | 24/5 |
| 2,029,043 A | * | 1/1936 | Wendell et al. | 47/55 |
| 2,293,531 A | * | 8/1942 | Brooks | 47/73 |
| 3,093,448 A | * | 6/1963 | Kirkpatrick et al. | 264/272.11 |
| 3,271,922 A | | 9/1966 | Wallerstein et al. | |
| 3,928,936 A | * | 12/1975 | Wollen | 47/41.15 |
| 3,987,583 A | * | 10/1976 | Takeyasu | 47/29 |
| 4,203,180 A | * | 5/1980 | Striplin | 24/17 B |
| 5,564,223 A | * | 10/1996 | Takita | 47/26 |
| 5,765,305 A | * | 6/1998 | Shaw | 47/58.1 |
| 5,896,988 A | * | 4/1999 | Jong | 206/423 |
| 6,092,329 A | * | 7/2000 | Hoshino | 47/26 |

FOREIGN PATENT DOCUMENTS

| | | | | |
|---|---|---|---|---|
| EP | 0095385 | * | 11/1983 | 47/55 |
| EP | 428234 A3 | | 11/1990 | |

* cited by examiner

Primary Examiner—Peter M. Poon
Assistant Examiner—Son T. Nguyen
(74) Attorney, Agent, or Firm—Dunlap, Codding & Rogers

(57) ABSTRACT

A bloom support device for protecting a cut flower during shipping, the bloom support device having a concave body providing a substantially closed proximal end clearingly disposed about a stem of the flower and a substantially open distal end compressingly folding a bloom of the flower into a folded arrangement and retaining the folded arrangement in a secure shipping arrangement. The concave body has a stress intensification feature for tearing the bloom support device off of the bloom.

11 Claims, 2 Drawing Sheets

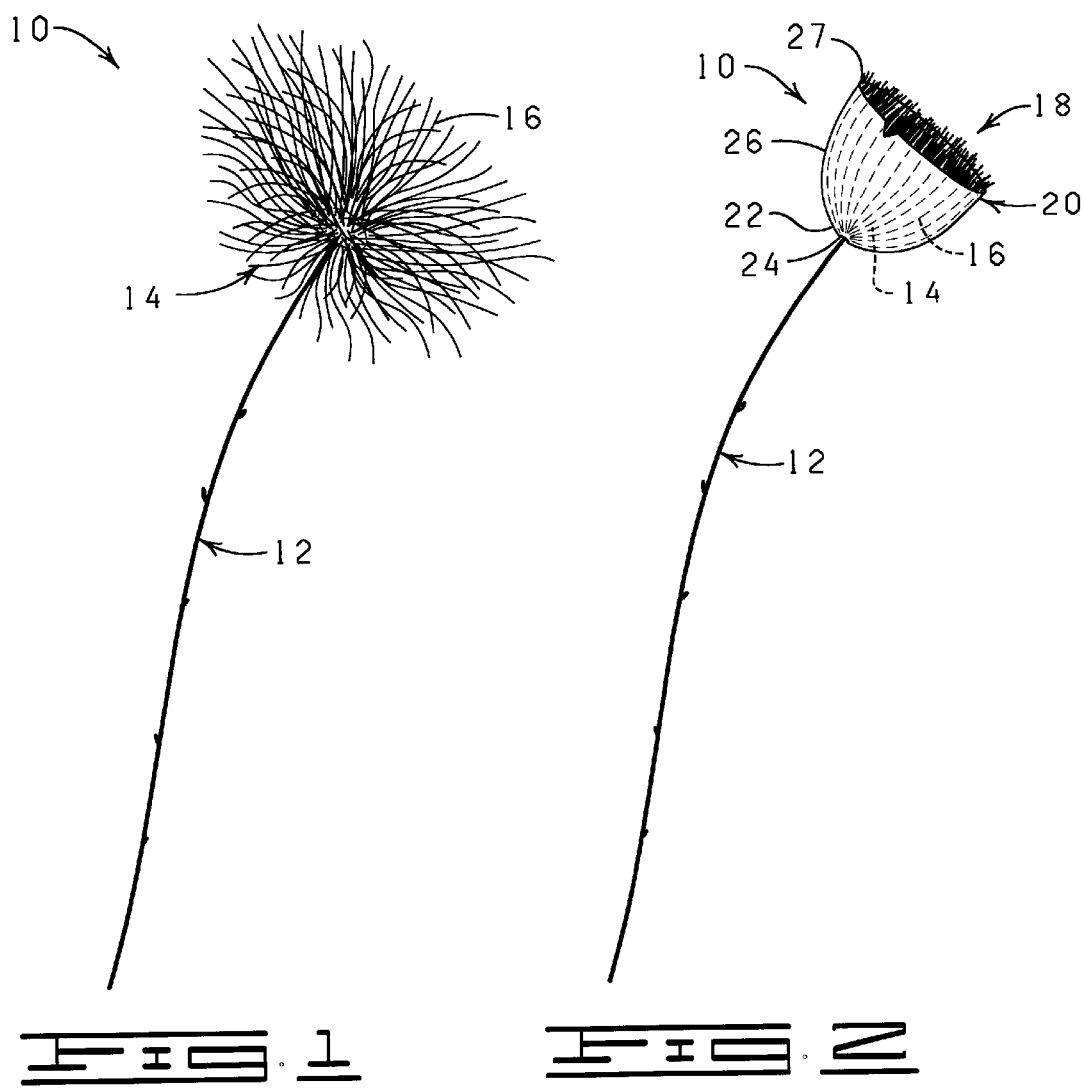
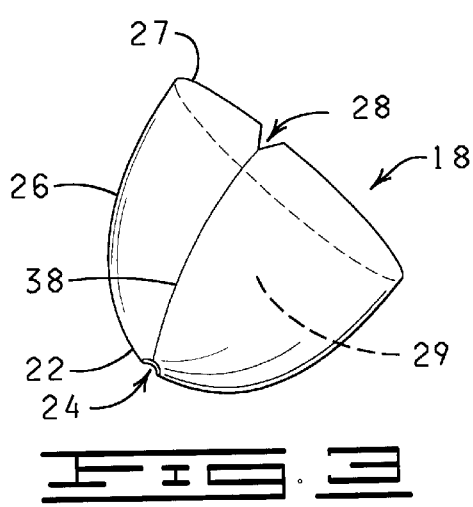

FLOWER BLOOM PROTECTIVE DEVICE

FIELD OF THE INVENTION

The present invention relates generally to the field of shipping and storage devices for blooming flowers, and more particularly, but not by way of limitation, to a device for protecting a flower bloom during shipping and storage.

SUMMARY OF THE INVENTION

The present invention provides a bloom support device for protecting the bloom of a cut flower during shipment and storage. The bloom support device has a concave body, substantially closed at a proximal end and forming an open distal end for receiving engagement of the bloom. An aperture is provided at the proximal end through which a stem portion of the flower is disposed as the concave body is moved along the stem toward the bloom in operatively placing the bloom support device about the bloom. In the operative position the concave body encapsulates the bloom, providing a compressive support to the bloom's delicate petals which are urged into a folded arrangement. A stress-intensification member is provided in the concave body to facilitate a tearing away of the bloom support device from the bloom in such a manner that in response to an applied tearing force, the stress-intensification member imparts a tearing of the concave body along a tear line extending between the distal end of the concave body with the aperture of the proximal end of the concave body. The stress intensification member can be a notch formed in the concave body extending a distance from the distal end and having an apex directed toward the aperture in the proximal end. A plurality of notches so arranged can be provided at the distal end of the concave body to facilitate the presentation of a notch to an operator. The stress-intensification member can also be a plurality of perforations defining such a tear-line.

The stress intensification member permits an effective tearing action from a vantage point most likely to be used by an employee who is unpackaging a batch of flowers. Namely, it is most likely that one unpackaging the flowers will tear the bloom support device from the outermost extremity, that is, from the more accessible distal end, because the operator is typically motivated to unpackage the flowers quickly. The stress intensification member provides the ability to tear away the bloom support device so as to unpackage the flowers in a minimal amount of time while preventing damage to the flower bloom and stem. These and other advantages and features of the present invention will be apparent from the following description when read in conjunction with the drawings and appended claims.

BRIEF DESCRIPTION OF THE DRAWINGS

FIG. 1 is a pictorial representation of a flower well-suited to receive a bloom support device of the present invention for protection during shipment and storage.

FIG. 2 is a pictorial representation of a cut flower of FIG. 1 having a bloom support device constructed in accordance with the present invention disposed about a bloom portion of the cut flower.

FIG. 3 is a pictorial representation of a bloom support device constructed in accordance with the present invention.

DETAILED DESCRIPTION

Figure 4:
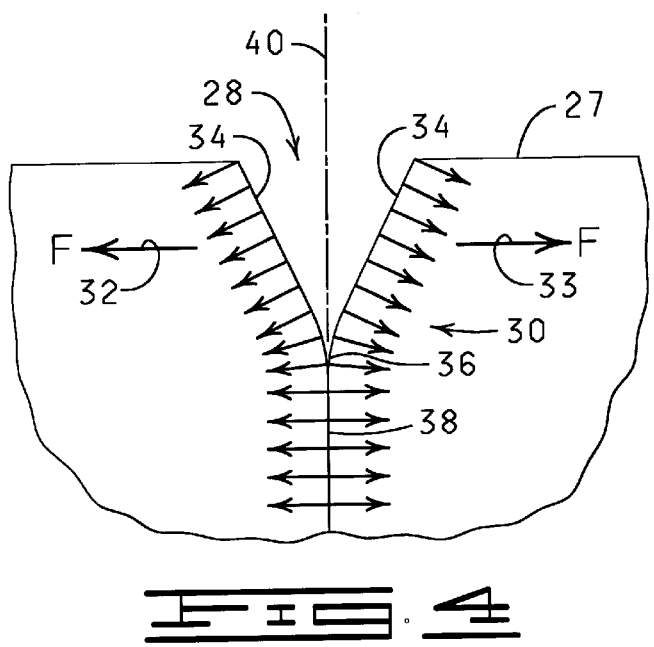
FIG. 4 is a diagrammatical illustration of a stress distribution imparted to the stress intensification member of the bloom support device of FIG. 3.

Referring to the drawings in general, and more particularly to FIG. 1, shown therein is a cut flower 10 having a stem portion 12 and a bloom portion 14. The bloom portion 14 is illustrated as having a plurality of petals 16 which are susceptible to damage during shipping.

Referring now to FIGS. 2 and 3, to prevent damage to the bloom portion 14 of the cut flower 10 during shipping, the petals 16 of the bloom portion 14 are folded toward each other, that is, in an arrangement of the petals 16 like a budded arrangement and a bloom support device 18 is positioned about the folded petals 16. The bloom support device 18 is provided with a concave body having a proximal end 22 with an aperture 24 through which the stem portion 12 (See FIG. 2) passes to allow the proximal end 22 to abut the bloom portion 14. An upwardly-extending, concave body 26 extends from the proximal end 22 and terminates in an open-ended distal end 27, the concave body 26 in this manner encapsulating the petals 16 in the folded arrangement. Thus, the concave body 26 is clearingly disposed about the stem portion 12 and supportingly disposed about the bloom portion 14.

The concave body 26 in this manner provides a cavity 29 for receiving engagement of the bloom portion 14. The open distal end 27 communicates with the cavity 29 for passage of the bloom portion 14 into the cavity 29. The aperture 24 in the proximal end permits passage of the stem portion 12 as the bloom portion 14 passes into the cavity 29.

It should be understood that removal of the bloom support device 18 from the bloom portion 14 can be achieved without damage to the stem portion 12 or the bloom portion 14, as described hereinbelow.

The concave body 26 can be provided by any of a number of conventional manufacturing methods. The bloom support device 18 can be made of a polymeric material and cut into a flat pattern, then thermoformed to provide the concave shape. Alternatively, the bloom support device 18 made of a polymeric material may be cut from a stack of two sheets that are appropriately seamed together. The bloom support device 18 may also be made of paper, foil, laminations and combinations thereof.

To enhance removal of the bloom support device 18 from the cut flowers, the open distal end 27 of the concave body 26 is provided with a notch 28. The notch 28 provides a stress intensification member facilitating a tearing action. The tearing action may be directed along a tear line, as defined by another stress intensification member along the concave body 26 such as a crease 38 shown in FIG. 3. In this manner, an operator removing the bloom support device 20 grasps it on opposing sides of the notch 28 and pulls the concave body 26 apart. FIG. 4 diagrammatically illustrates the resultant stress field 30 that acts on the distal end 27 as a tearing force "F" is applied in opposite directions across the notch 28, the force denoted by arrows 32, 33. The stress vectors act orthogonally to the sloping edges 34 of the notch 28, the apex 36 of which creates a stress intensification member to decrease the magnitude of the force "F" necessary to shear the material to propagate a tear. Once the tear forms, it will be noted the stress field acts on the material in a substantially parallel direction to that of the applied force "F," such that an even lesser magnitude of force "F" is necessary to continue the tearing action once the tear is initially propagated. A relatively sharp notch 28, having steeply sloped edges 34, provides a relatively large stress intensification member. By providing a sharp notch 28, the resulting force "F" necessary to initiate a tear can be provided as substantially the same force "F" that is required to continue the tear once initiated.

It will be noted that in tearing the concave body 26 of the bloom support device 18 along the tear line that extends between the notch 28 with the aperture 24, the notch 28 is formed with the apex 36 at a desired axial plane 40 that includes the axial center line of the concave body 26. The edges 34 of the notch 28 are substantially equilaterally disposed about the axial plane 40. By selecting an appropriate material for the bloom support device 18, the tear propagates in a tear line along the axial plane 40 and thereby separates the bloom support device 20 from the flower 10 by tearing along a line extending between the notch 28 and aperture 24 without the aid of a stress intensification member along the concave body 26, such as the crease 38 in FIG. 3.

Figure 5:
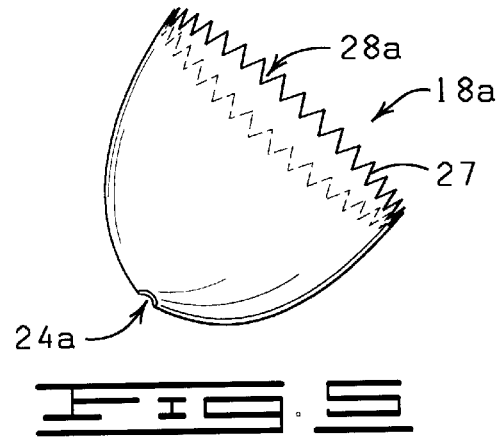
FIG. 5 is a pictorial representation of a bloom support device constructed in accordance with the present invention having a plurality of stress intensification members.

FIG. 5 shows a bloom support device 18a wherein the distal end 27a has a plurality of notches 28a, at least one of which can be selected for use in initiating the tearing action as discussed above. Although shown as a plurality of notches, only one of the notches is designated by the reference numeral 28a. By providing a number of notches 28a it is contemplated that the operator will use the one most accessible and therefore not need to reposition the flower to access one of the notches 28a. This is beneficial where a number of flowers 10 are typically bulk packaged closely together, wherein providing a number of notches 28a makes it more likely the operator will initiate the tearing action at a notch 28a as desired.

Figure 6:
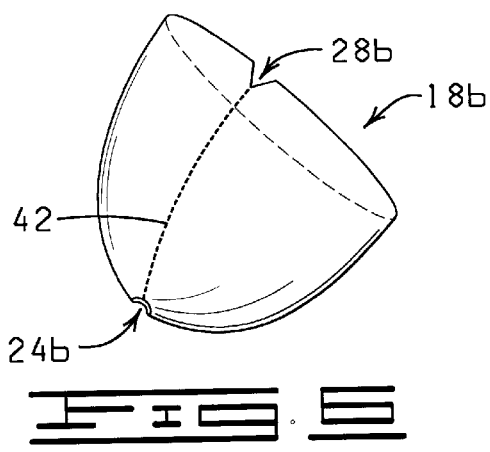
FIG. 6 is a pictorial representation of a bloom support device constructed in accordance with the present invention having a plurality of longitudinal perforations.

FIG. 6 shows yet another bloom support device 18b wherein a plurality of perforations 42 is provided between the notch 28b and the aperture 24b. Like the crease 38 of the concave body 26 of FIG. 3, the plurality of perforations 42 provides a stress intensification member defining the tear line extending between the notch 28b and the aperture 24b independent of the material characteristics associated with the direction of the tear line. Other stress intensifications will work as well, such as a seam. It will be noted that a longitudinal stress intensification member along the concave body 26 may be used in conjunction with one notch 28b as in FIG. 6, as well as a plurality of stress intensification members each used with a corresponding notch 28a as in FIG. 5.

The foregoing description thus provides a method for packaging one or more flowers, and hence a batch of flowers in like manner, at a shipping location and subsequently unpackaging the flowers at a destination location. The bloom support device 18 is placed onto the bloom portion 14 to urge a folded arrangement of the petals 16 to prevent damage. The flower is then shipped to the destination in the folded arrangement. At the destination the bloom supports 18 are removed quickly and easily by tearing the bloom support device as facilitated by a stress intensification member, that is, at an accessible notch or perforation.

It is to be understood that even though numerous characteristics and advantages of various embodiments of the present invention have been set forth in the foregoing description, together with details of the structure and function of various embodiments of the invention, and changes may be made in details especially in matters of structure and arrangement of parts within the principles of the present invention to the full extent indicated by the broad general meaning of the terms in which the appended claims are expressed.

What is claimed is:

1. A bloom support device for protecting a flower, the flower having a stem and a bloom, the bloom support device comprising:

a thermoformed concave polymeric body having a substantially opened distal end, a substantially closed proximal end, and a cavity extending between the substantially closed proximal end and the substantially open distal end adapted to receive the bloom of the flower, the substantially closed proximal end having an aperture therein adapted to receive the stem of the flower whereby upon inserting the stern of the flower through the aperture and slidingly moving the thermoformed concave polymeric body along the stem of the flower so that the bloom of the flower is disposed within the cavity of the thermoformed concave polymeric and body; and a tear line disposed on the thermoformed concave polymeric body for tearing the thermoformed concave polymeric body from the substantially opened distal end to the aperture, in the substantially closed proximal end of the thermoformed concave polymeric body in order to remove the thermoformed concave polymeric body from the flower.

2. The bloom support device of claim 1 wherein the tear line comprises an edge in the distal end forming a notch.

3. The bloom support device of claim 2 wherein the notch forms a substantially triangular aperture in the distal end with an apex directed toward the proximal end of the concave body, the apex positioned on a desired axial plane between the proximal and distal ends and the notch formed of a pair of opposing angular edges that extend from the apex toward the distal end substantially equilaterally relative to the axial plane.

4. The bloom support device of claim 3 wherein the notch provides a stress intensification characteristic in the concave body in response to a pulling force applied in substantially opposite directions across the notch, the stress intensification characteristic reducing the pulling force necessary to initiate a tear in the concave body at the apex of the notch.

5. The bloom support device of claim 4 wherein the stress intensification characteristic provides for a pulling force necessary to initiate a tear in the concave body that is substantially the same as a pulling force necessary to continue the tear after the tear has been initiated.

6. The bloom support device of claim 3 wherein a selected pulling force applied substantially in opposite directions across the notch initiates a tear in the concave body that propagates from the apex of the notch to the aperture in the proximal end.

7. The bloom support device of claim 1 wherein the tear line comprises an edge in the distal end forming a plurality of notches.

8. The bloom support device of claim 7 wherein each notch forms a substantially triangular aperture in the distal end with an apex directed toward the proximal end of the concave body, each apex positioned on a desired axial plane between the proximal and distal ends and each notch formed of a pair of opposing angular edges that extend from the apex toward the distal end substantially equilaterally relative to the respective axial plane.

9. The bloom support device of claim 1 wherein the tear line comprises a plurality of longitudinally extended perforations in thermoformed concave polymeric body connecting the distal end and the aperture in the proximal end of the thermoformed concave polymeric body.

10. The bloom support device of claim 9 in combination with a notch in the distal end formed of angled edges connected at an apex that is contiguous with the perforations.

11. The bloom support device of claim 1 wherein the thermoformed concave polymeric body is formed of a pair of polymeric sheets that are seamed together to provide the concave characteristic.

* * * * *

UNITED STATES PATENT AND TRADEMARK OFFICE
CERTIFICATE OF CORRECTION

PATENT NO. : 6,354,039 B1
DATED : March 12, 2002
INVENTOR(S) : Donald E. Weder

It is certified that error appears in the above-identified patent and that said Letters Patent is hereby corrected as shown below:

Drawings,
Fig. 2, delete "20" and lead line
Fig. 2. add arrow to lead line of 26

Column 3,
Line 30, "device 20" should be -- device 18 --

Column 4,
Line 31, "stern" should be -- stem --

Signed and Sealed this

Fifth Day of November, 2002

Attest:

Attesting Officer

JAMES E. ROGAN
Director of the United States Patent and Trademark Office